United States Patent
Ser et al.

(10) Patent No.: US 7,369,688 B2
(45) Date of Patent: May 6, 2008

(54) METHOD AND DEVICE FOR COMPUTER-BASED PROCESSING A TEMPLATE MINUTIA SET OF A FINGERPRINT AND A COMPUTER READABLE STORAGE MEDIUM

(75) Inventors: Wee Ser, Singapore (SG); Xudong Jiang, Singapore (SG); Wei Yun Yau, Singapore (SG)

(73) Assignee: Nanyang Technological Univeristy, Singapore (SG)

( * ) Notice: Subject to any disclaimer, the term of this patent is extended or adjusted under 35 U.S.C. 154(b) by 1097 days.

(21) Appl. No.: 10/477,050

(22) PCT Filed: May 9, 2001

(86) PCT No.: PCT/SG01/00087

§ 371 (c)(1),
(2), (4) Date: Nov. 7, 2003

(87) PCT Pub. No.: WO02/091285

PCT Pub. Date: Nov. 14, 2002

(65) Prior Publication Data

US 2004/0199775 A1    Oct. 7, 2004

(51) Int. Cl.
*G06K 9/00* (2006.01)
*G06K 9/74* (2006.01)
*B42D 15/00* (2006.01)
*G03B 29/00* (2006.01)
*G05B 19/00* (2006.01)

(52) U.S. Cl. .......................... 382/124; 283/68; 283/78; 356/71; 396/15; 340/5.83

(58) Field of Classification Search ........ 382/115–116, 382/124–127; 283/67–69, 78; 356/71; 396/15; 340/5.8–5.83; D14/383, 384
See application file for complete search history.

(56) References Cited

U.S. PATENT DOCUMENTS

| | | | | |
|---|---|---|---|---|
| 3,959,884 A | * | 6/1976 | Jordan et al. | 283/69 |
| 4,135,147 A | * | 1/1979 | Riganati et al. | 382/125 |
| 4,607,384 A | * | 8/1986 | Brooks | 382/124 |
| 4,646,352 A | | 2/1987 | Asai et al. | |
| 4,696,046 A | | 9/1987 | Schiller | |
| 5,465,303 A | * | 11/1995 | Levison et al. | 382/124 |
| 5,493,621 A | * | 2/1996 | Matsumura | 382/125 |
| 5,841,888 A | * | 11/1998 | Setlak et al. | 382/124 |
| 6,049,621 A | * | 4/2000 | Jain et al. | 382/125 |
| 6,122,395 A | * | 9/2000 | Yamaguchi et al. | 382/125 |
| 6,160,903 A | * | 12/2000 | Hamid et al. | 382/115 |

(Continued)

OTHER PUBLICATIONS

X.D. Jiang, W.Y. Yau and W. Ser, Minutiae Extraction by Adaptive Tracing the Gray Level Ridge of the Fingerprint Image, *Proc. IEEE Sixth International Conference on Image Processing*, Kobe, Japan, vol. 2, pp. 852-856, Oct. 1999.

(Continued)

*Primary Examiner*—Bhavesh M. Mehta
*Assistant Examiner*—Manav Seth
(74) *Attorney, Agent, or Firm*—Foley & Lardner, LLP

(57) ABSTRACT

A template minutia set of a fingerprint comprising template minutiae and a template interest region is provided. Further, an input minutia set comprising input minutiae and an input interest region according to an input fingerprint is provided. The input minutia set is matched with the template minutia set. All matching template/input minutiae are determined. Furthermore, an updated template minutia set is determined dependent on the matching template/input minutiae and the non-matching template/input minutiae, and dependent on whether the template minutiae are inside the input interest region or outside of it and whether the input minutiae are inside the template interest region or outside of it.

15 Claims, 5 Drawing Sheets

U.S. PATENT DOCUMENTS

| | | | |
|---|---|---|---|
| 6,185,318 B1 * | 2/2001 | Jain et al. | 382/125 |
| 6,233,348 B1 * | 5/2001 | Fujii et al. | 382/125 |
| 6,314,196 B1 * | 11/2001 | Yamaguchi et al. | 382/125 |
| 6,434,259 B1 * | 8/2002 | Hamid et al. | 382/115 |
| 6,487,306 B1 * | 11/2002 | Jain et al. | 382/125 |
| 6,546,122 B1 * | 4/2003 | Russo | 382/125 |
| 6,567,765 B1 * | 5/2003 | Wu et al. | 702/182 |
| 6,778,685 B1 * | 8/2004 | Jiang et al. | 382/124 |
| 7,050,609 B2 * | 5/2006 | Huang | 382/124 |
| 7,236,617 B1 * | 6/2007 | Yau et al. | 382/125 |

OTHER PUBLICATIONS

D. Maio and D. Maltoni, "Direct Gray-Scale Minutiae Detection in Fingerprints, *IEEE Transactions on Pattern Analysis and Machine Intelligence*", vol. 19, No. 1, pp. 27-39, Jan. 1997.

X.D. Jiang, W.Y. Yau and W. Ser, "Detecting the Fingerprint Minutiae by Adaptive Tracing the Gray Level Ridge," *Pattern Recognition*, vol. 34, pp. 999-1013, May 2001.

X.D. Jiang and W.Y. Yau "Fingerprint Minutiae Matching Based on the Local and Global Structures," *Proc. 15th International Conference on Pattern Recognition, ICPR*, Barcelona, Spain, vol. 2, pp. 1042-1045, Sep. 2000.

X.D. Jiang, W.Y. Yau and W. Ser, "Fingerprint Image Processing for Automatic Verification, Proc. IEEE Second International Conference on Information," *Communication & Signal Processing*, Singapore, Dec. 1999.

A.K. Jain, L. Hong, S. Pankanti and R. Bolle, "An Identify-Authentication System Using Fingerprints," *Proc. IEEE*, vol. 85, No. 9 pp. 1365-1388, Sep. 1997.

* cited by examiner

METHOD AND DEVICE FOR COMPUTER-BASED PROCESSING A TEMPLATE MINUTIA SET OF A FINGERPRINT AND A COMPUTER READABLE STORAGE MEDIUM

BACKGROUND OF THE INVENTION

The invention relates to a method and a device for computer-based processing a template minutia set of a fingerprint and a computer readable storage medium.

In order to provide an identification mechanism based on biometric characteristics of a person which is to be identified, one biometric characteristic often used for personal verification/identification is the person's fingerprint.

In this kind of verification/identification, typically the person's fingerprint is detected by a fingerprint sensor, thereby generating a fingerprint image.

The word "fingerprint" is herein used as a representative of a fingerprint or a like pattern or figure. More particularly, the fingerprint may be an actual finger; a palm print, a toe print, a soleprint, a squamous pattern, and a streaked pattern composed of streaks. The fingerprint may also be a diagram drawn by a skilled person to represent a faint fingerprint remain which is, for example, left at the scene of a crime.

Usually, the person, who would like to use a device for this kind of verification/identification is required to register his or her fingerprint in a registration step for later verification/identification in a verification/identification step.

During the registration, characteristic features of the fingerprint will be extracted and stored in a storage media of the device. Such a fingerprint image is called the template fingerprint and such a stored characteristic features are called the template minutiae.

When a person wants to use the device, he has to present his fingerprint to the device.

The unknown fingerprint of the person who wants to be identified in a verification/identification step is usually called input fingerprint. The characteristic features of the input fingerprint will be extracted and matched against the template minutiae of the template fingerprint. If a match is found, the person is identified as the person the respective pre-stored template fingerprint refers to. Otherwise, the person is identified as an unauthorized user and the further use of the device will be prohibited.

The template minutiae usually comprise geometrical and other useful characteristic information (or features) pertaining to the local discontinuities (the minutiae) of the fingerprint, such as the type of the current minutiae, the location of the current minutiae, the direction of the current minutiae, the ridge count between the current minutiae and its neighboring minutiae, the location of the neighboring minutiae, the distance relationship of the current minutiae with respect to its neighboring minutiae, and/or the angular relationship of the current minutiae with respect to its neighboring minutiae.

In [1], [2] and [3], methods to determine the template minutiae are described. The basic concept of these methods is to determine the minutiae present in a single fingerprint image. From these determined minutiae, the required parameters are subsequently determined.

Furthermore, methods to match the fingerprints or to compare whether two fingerprints are similar to each other or not using the fingerprint templates, are described in [4], [5], [6] and [7].

Noise, contrast deficiency, improper image acquisition, geometrical transformation, deformation and skin elasticity will make a captured fingerprint image deviate from the ideal fingerprint of the person. The poor quality of the captured fingerprint image will make a reliable minutia extraction very difficult. Spurious minutiae can be produced, valid minutiae can be dropped and the minutia type (ending and bifurcation) may be exchanged due to the noise and interference of the fingerprint image. The problem of automatic minutia extraction has been thoroughly studied but never completely solved. The employment of various image enhancement techniques can only partly solve the problem [8]. In [2] five different minutia extraction techniques well known in the literature were implemented and their performances were compared. In the experiments disclosed in [2], the best technique dropped 4.51% genuine minutiae, produced 8.52% spurious minutiae and caused 13.03% minutiae exchanged their type. The total error is then 26.07%. For the rest four approaches, the total error is 33,83%, 119.80%, 207.52% and 216.79%, respectively. From these experimental results it is seen that a perfect minutia extraction is a very difficult task.

An automatic fingerprint verification/identification system will successively receive fingerprint images of users in the practical application after the registration. The fingerprint imaging condition, which causes the minutia extraction error, will change with time due to the change of the skin condition, climate and on-site environment. Thus, the image noises and interferences of fingerprints received by the system at different time might be quite different.

However, improving the fingerprint image quality based on these multiple images is very difficult and memory and computation too expensive due to the image size and image pose transformation.

SUMMARY OF THE INVENTION

Thus, it is an objective of the invention, to overcome at least one of the above mentioned shortcomings.

This objective can be achieved with a method and a device that uses computer(s) to process a template minutia set of a fingerprint or a computer readable storage medium, according to the features described in the independent claims.

In the method that uses computer(s) to process a template minutia set of a fingerprint, a template minutia set comprising template minutiae and a template interest region is provided. Furthermore, an input minutia set according to an input fingerprint comprising input minutiae and an input interest region is provided. The input minutia set is matched with the template minutia set. Thereby, matching template/input minutiae and non-matching template/input minutiae are determined. Finally, an updated template minutia set is determined dependent on the matching template/input minutiae and the non-matching template/input minutiae, and dependent on whether the template minutiae are inside the input interest region or outside of it and whether the input minutiae are inside the template interest region or outside of it.

Matching in this context means, that 1) there is determined the similarity between the template minutia set and the input minutia set or the template minutia set and the input minutia set are known originated from a same finger and 2) the template/input minutiae are classified as matching template/input minutiae or non-matching template/input minutiae according to a predetermined matching threshold.

A computer-based device for processing a template minutia set of a fingerprint comprises a processing unit, which is arranged to execute the following steps: The template minutia set comprising template minutiae, a template interest region, and a certainty value for each template minutia is provided. An input minutia set according to an input fingerprint comprising input minutiae, an input interest region, and a certainty value for each input minutia is provided. The input minutia set is matched with the template minutia set. Thereby, matching template/input minutiae and non-matching template/input minutiae are determined. A transformation function using the matching result is determined, wherein the transformation function describes the relation between the template minutiae and the input minutiae. An updated template minutia set is determined by: adding non-matching input minutiae inside the template interest region to the updated template minutia set if the input minutia set and the template minutia set are known originated from a same finger or their matching result is higher than a matching threshold; increasing the certainty values of matching template minutiae; decreasing the certainty values of non-matching template minutiae that are inside the input interest region; deleting template minutiae from the updated template minutia set if their certainty values are below a certainty threshold; and using the template minutiae, whose certainty values are larger than the certainty threshold, for the future matching. Finally, the above mentioned steps are repeated iteratively for all input minutia sets of a plurality of input minutia sets, wherein the updated template minutia set is used as the template minutia set of the next iteration, and wherein the next input minutia set is used as the input minutia set of the next iteration.

A computer readable storage medium has a program recorded thereon, where the program makes the computer execute a procedure comprising the following steps for processing a template minutia set of a fingerprint: The template minutia set comprising template minutiae, a template interest region, and a certainty value for each template minutia is provided An input minutia set according to an input fingerprint comprising input minutiae, an input interest region, and a certainty value for each input minutia is provided. The input minutia set is matched with the template minutia set. Thereby, matching template/input minutiae and non-matching template/input minutiae are determined. A transformation function using the matching result is determined, wherein the transformation function describes the relation between the template minutiae and the input minutiae. An updated template minutia set is determined by: adding non-matching input minutiae inside the template interest region to the updated template minutia set if the input minutia set and the template minutia set are known originated from a same finger or their matching result is higher than a matching threshold; increasing the certainty values of matching template minutiae; decreasing the certainty values of non-matching template minutiae that are inside the input interest region; deleting template minutiae from the updated template minutia set if their certainty values are below a certainty threshold; and using the template minutiae, whose certainty values are larger than the certainty threshold, for the future matching. Finally, the above mentioned steps are repeated iteratively for all input minutia sets of a plurality of input minutia sets, wherein the updated template minutia set is used as the template minutia set-of the next iteration, and wherein the next input minutia set is used as the input minutia set of the next iteration.

The above described method and device for computer-based processing a template minutia set of a fingerprint enable processing the template minutia set not only during the fingerprint registration process but also during each fingerprint verification/identification process. Thereby, the stored template minutia set is continuously updated and verification/identification of a person becomes more and more reliable, because the template minutia set will be based on multiple input fingerprint images. A processing of the template minutia set is also necessary due to different fingerprint imaging conditions. The invention enables the template minutia set to become more and more independent of disturbances such as noise and interference, of changes of the skin condition and of the climate and on-site environment. Thus, the image noises and interferences of fingerprints received by the system at different points of time produce less difficulties with increasing number of input fingerprint images.

According to one embodiment of the invention, the method further comprises: determining a plurality of input minutia sets comprising a certainty value for each input minutia, and determining the updated template minutia set by generating updated template minutiae from all input minutia sets with their corresponding weights.

Therefore, the detection of spurious minutiae and the non-detection of genuine minutiae can more easily be limited. For instance, a minutia missing in the template minutia set but present in a first, second, . . . input minutia set has a higher probability that this minutia is a genuine minutia; a minutia present in the template minutia set but missing in a first, second, . . . input minutia set has a higher probability that this minutia is a spurious minutia. Thus, certainty values stored together with the template minutiae enable the detection and elimination of spurious minutiae and the recovery of dropped minutiae.

The plurality of input minutia sets preferably comprises a time series of input minutia sets. Then, the certainty value could for instance be a function of time of the corresponding input minutia set.

According to a preferred embodiment of the invention, the template minutia set will be updated if the template minutia set and the input minutia set are known originated from a same finger or if the matching result of the corresponding input minutiae is higher than a matching threshold, and the determination of the updated template minutia set comprises: 1) adding non-matching input minutiae inside the template interest region to the updated template minutia set and put a certainty value on them, 2) increasing the certainty values of matching template minutiae, 3) decreasing the certainty values of non-matching template minutiae which are inside the input interest region, and 4) deleting template minutiae from the updated template minutia set if their certainty values are below the matching threshold.

Each interest region can be described by its boundary and the boundaries of the interest regions are preferably obtained using points located on the respective boundary. According to one embodiment of the invention the boundaries of the template interest region and of the input interest region each define a polygon. Such a polygon can be described by eight or 16 points.

Preferably the input minutia set is aligned with respect to the template minutia set before the matching process is started. Such an alignment is very useful due to the fact that a user never presents his fingerprint exactly aligned to the fingerprint detector.

The template minutia set is preferably selected from a number of reference minutia sets. Then, the starting probability of the verification/identification process is quite good. Each reference minutia set comprises a reference interest region and it is preferred to select the reference minutia set with the largest reference interest region as the template minutia set.

According to a preferred embodiment of the invention, the method further comprises determining of whether an input minutia is located inside the template interest region or outside of it during the matching process, and determining of whether a template minutia is located inside the input interest region or outside of it during the matching process. Such an information is necessary for updating the certainty values of the template minutiae.

The alignment of the input minutia set with respect to the template minutia set is preferably performed by a transformation function, which is given by the following formula:

$$\begin{pmatrix} x_j^A \\ y_j^A \end{pmatrix} = \begin{pmatrix} x^P \\ y^P \end{pmatrix} + \begin{pmatrix} \cos(\Delta\varphi) & \sin(\Delta\varphi) \\ -\sin(\Delta\varphi) & \cos(\Delta\varphi) \end{pmatrix} \cdot \begin{pmatrix} x_j^I - x^I \\ y_j^I - y^I \end{pmatrix},$$

wherein $(x_j^A, y_j^A)$ are aligned point vectors representing the location of an aligned point with j as characterizing number of each aligned point, $(x^P, y^P)$ is a reference point of the template minutia set, $(x_j^I, y_j^I)$ is a point in the input interest region with j as characterizing number of each point, $(x^I, y^I)$ is a reference point of the input minutia set, and $\Delta\varphi$ is an angle enclosed from $(x^P, y^P)$ and $(x^I, y^I)$.

The above mentioned transformation function enables both a rotation as well as a translation of the input interest region relative to the template interest region.

As already mentioned above, it is preferred to repeat the update process of the template minutia set iteratively for all input minutia sets of a plurality of input minutia sets. Then, the updated template minutia set is used as template minutia set of the next iteration and the next input minutia set is used as the input minutia set of the next iteration.

The above described method and device for computer-based processing a template minutia set of a fingerprint enables an update of the template minutia parameter and of the template minutia certainty value by using a recursive algorithm that implements a weighted averaging over all received matched fingerprints. The weighted averaging increases the precision of minutia parameter, corrects the exchanged minutiae, recovers dropped minutiae and removes spurious minutiae. Furthermore, the proposed scheme has the weights of the received fingerprints changed with the time so that older fingerprints have less and less contribution to the weighted average. In this way, the method gradually weakens the effect of older skin and imaging conditions and enhances the recent ones. By using the common region of two matched fingerprints, the template minutiae will not grow to cover the whole finger but are kept within the region of the initial template fingerprint. The proposed recursive algorithm minimizes the computation time and memory size required by calculating a weighted average. This makes the invention having no problem to be employed in an on-line fingerprint verification/identification system.

BRIEF DESCRIPTION OF THE DRAWINGS

FIG. 3 shows a time series of matched input minutia sets according to a preferred embodiment of the invention. The minutiae are designated with the symbol "x" and "o".

DESCRIPTION OF THE PREFERRED EMBODIMENTS

A preferred embodiment of this invention and modifications thereof will now be described with reference to the accompanying drawings.

Figure 1:
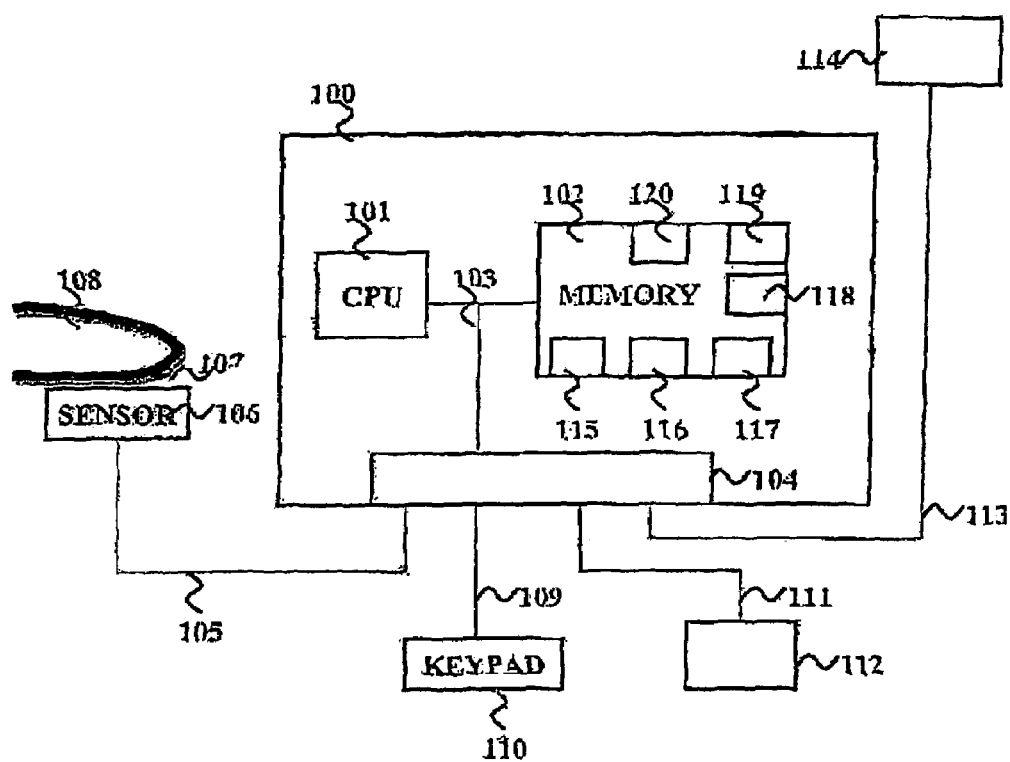
FIG. 1 shows a block diagram of a computer which is used to perform the steps of the method according to a preferred embodiment of the invention.

FIG. 1 shows a computer 100 comprising
a central processing unit (CPU) 101,
a storage device 102,
a computer bus 103, and
an input-/output-interface 104.

The central processing unit 101, the storage device 102 and the input-/output-interface 104 are coupled with the computer bus 103 for exchanging electrical signals.

Via the input-/output-interface 104 and a first connection 105, the computer 100 is coupled with a fingertip sensor 106, according to this embodiment the FingerTip™ sensor of Infineon, Inc., with which fingertip images of a fingertip 107 are taken from a finger 108. Furthermore, via the input-/output-interface 104 and a second connection 109, the computer 100 is coupled with a keyboard 110, and via a third connection 111, the computer 100 is coupled with a computer mouse 112. Via the input-/output-interface 104 and a fourth connection 113, the computer 100 is coupled with a display 114.

After the fingertip sensor 106 has taken the fingerprint images, the fingertip images 115 are sent from the fingertip sensor 107 to the computer 100, where they are stored in the storage device 102. In the storage device 102, there is further stored a computer program 117, which makes the computer 100 execute a method comprising the steps, which will further be described in detail.

For further explanation, it is assumed, that each image comprises minutiae of the finger 108, which are extracted from the images 115.

As described in [9], a fingerprint image can be segmented into the interest region and the background with a segmentation algorithm. An interest region can be represented by a point set S, which contains all x- and y-coordinates of points within this interest region. The image in the interest region can be considered as an oriented texture pattern that contains ridges separated by valleys. Ridge endings and ridge bifurcations are minutiae that are used to match two fingerprints.

For each minutia, a minutia feature vector $F_k$ 116 (k= 1, ..., n) is determined and stored in the storage device 102. The minutia feature vector $F_k$ 116 comprises the following features:

$$F_k = (x_k, y_k, \varphi_k, t_k), \quad (1)$$

wherein x_k is a first coordinate of the minutia k in a given right-hand orthogonal coordinate space, y_k is a second coordinate of the minutia k in the coordinate space, φ_k is a direction (−π<φ_k≦π), which is defined as a local ridge direction of an associated ridge of the minutia k, t_k is a minutia type of minutia k out of a given amount of minutia types (for example, t_k=0 for ridge ending and t_k=1 for bifurcation).

The first coordinate $x_k$, the second coordinate $y_k$, and the direction $\phi_k$ are dependent on the position and orientation of the finger 108 on the fingertip sensor 106, when the fingertip 107 is acquired. These features, i.e. characteristics, are not rotation and translation invariant.

A minutia set F is a parameter vector set that consists of parameter vectors $F_k$ 116 (k=1, ..., n) of all minutiae detected from a fingerprint.

Figure 2:
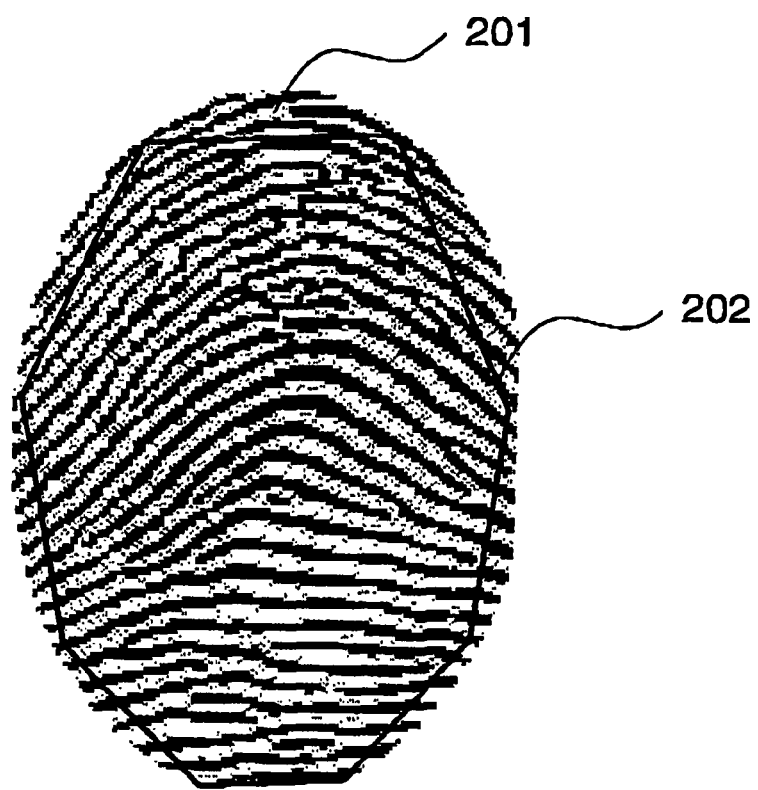
FIG. 2 shows an input fingerprint image comprising an input interest region of the fingerprint according to a preferred embodiment of the invention.

FIG. 2 shows an input fingerprint image 201 and an input interest region 202 of the input fingerprint image 201.

As already mentioned above the input fingerprint image 201 can be considered as an oriented texture pattern that contains ridges separated by valleys. Ridge endings and ridge bifurcations are minutiae that are used to match two fingerprints.

As the skin and imaging conditions change with time the fingerprint image characteristics do change with time. As the result, input minutia sets extracted from the input fingerprint image 201 captured during a verification/identification process might be quite different from a template minutia set. Therefore, input minutia sets can be used to update the template minutia set if they are matched or if they are known originated from a same finger. To update the template minutia set, all matched input minutia sets and their input interest regions need to be stored and a arithmetic average over all matched input minutia sets need to be calculated for every time of an update of the template minutia set. This will produce a large size of the template minutia set and long computation time. However, a small size of template minutia set and a high speed for verification/identification are often required in the application, especially for a stand-alone system. To save the memory size and speed up the update process, we need a simplified input interest region 202 and a recursive algorithm.

Figure 4:
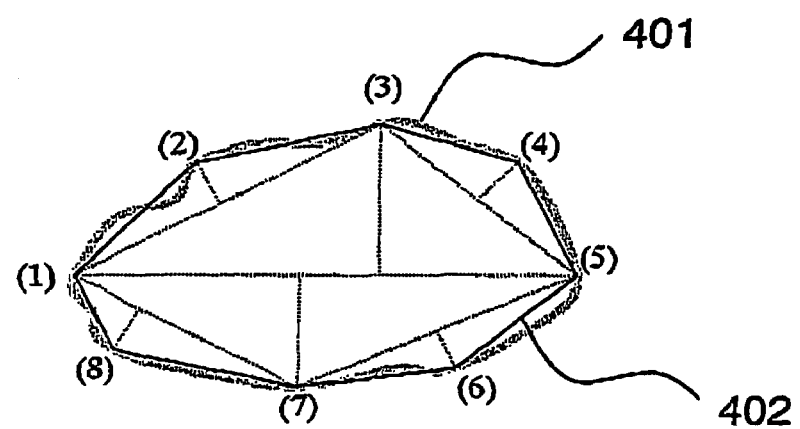
FIG. 4 shows an input interest region of an input fingerprint according to a preferred embodiment of the invention.

We use a polygon described with a few points to approximate the input interest region 202 of an input fingerprint image 201. FIG. 4 shows the boundary of an input fingerprint image 201 and as example the resulting polygon 402 for the input interest region 401. Two farthest points in the boundary are found as shown as points (1) and (5). The point marked (3) has the longest perpendicular distance from the top boundary to line (1)-(5). Similarly, point (7) has the longest distance in the bottom segment. Using the same method, points (2), (4), (6) and (8) can be found. In this way, a fingerprint boundary is approximated by a polygon that can be described by a few points. The size of the fingerprint template is thus only slightly increased by adding the coordinates of a few points. According to this embodiment, eight points are used. It is also possible to use 16 points, for instance.

Figure 5:
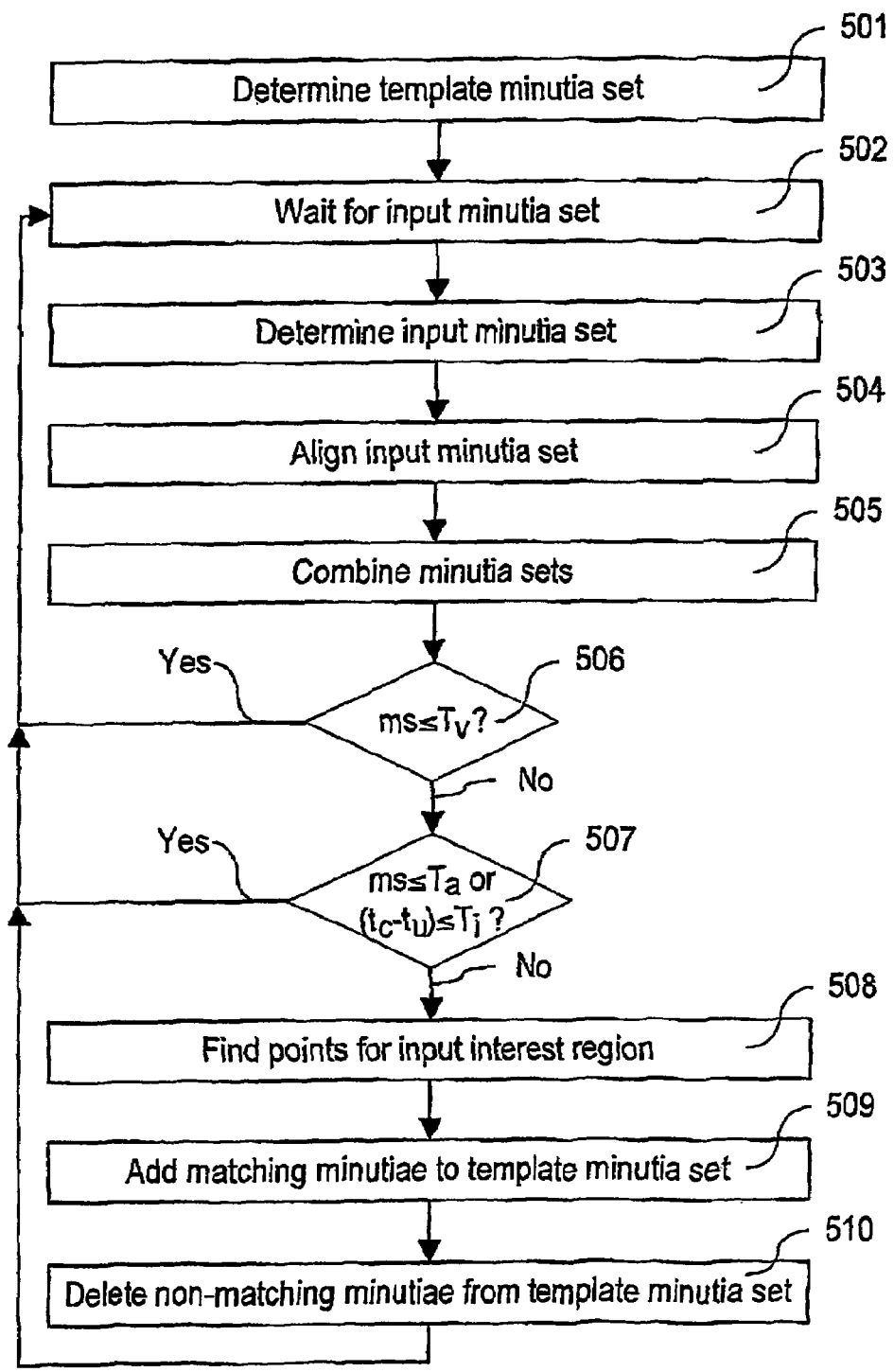
FIG. 5 shows a flow diagram showing the steps of the method according to a preferred embodiment of the invention.

In a first step (step 501) of the method according to the preferred embodiment of the invention, a template minutia set is determined by using the method described in [3] (see FIG. 5)

In a further step (step 502), for each input fingerprint image 201, the respective input minutia set is provided. If the input minutia set is to be determined from an input fingerprint image 201, the input minutia set is determined by using the method described in [3].

Fingerprint minutia matching is to find a similarity level between two minutia sets $F^P$ and $F^I$, one from the template fingerprint image and another from the input fingerprint image, respectively. The input fingerprint image usually has rotation and translation relative to the template fingerprint image. Before performing the matching, the minutiae of the input fingerprint image are to be aligned with the template fingerprint image. To be specific, two corresponding reference minutiae $(x^P, y^P, \phi^P, t^P)^T \in F^P$ and $(x^I, y^I, \phi^I, t^I)^T \in F^I$ can be found by using the method in [4]. The aligned minutia set $F^A=\{F_k^A\}$ is obtained by translating and rotating all input minutiae $F_k^I$ (k=1, 2, ..., $K^I$) with respect to the two reference minutiae, according to the following formula:

$$F_k^A = \begin{pmatrix} x_k^A \\ y_k^A \\ \varphi_k^A \\ t_k^A \end{pmatrix} \qquad (2)$$

$$= \begin{pmatrix} x^P \\ y^P \\ \varphi^P \\ 0 \end{pmatrix} + \begin{pmatrix} \cos(\Delta\varphi) & \sin(\Delta\varphi) & 0 & 0 \\ -\sin(\Delta\varphi) & \cos(\Delta\varphi) & 0 & 0 \\ 0 & 0 & 1 & 0 \\ 0 & 0 & 0 & 1 \end{pmatrix} \begin{pmatrix} x_k^I - x^I \\ y_k^I - y^I \\ \varphi_k^I - \varphi^I \\ t_k^I \end{pmatrix}.$$

Two minutiae, one from the template fingerprint image and another from the input fingerprint image are said being matched if the difference of their aligned parameter is within a threshold. Based on the matched and non-matched minutiae, a matching score that describes the similarity of the two minutia sets is calculated [4]. An input fingerprint is said being matched with a template fingerprint if their matching score ms is greater than a predetermined threshold $T_v$.

At the beginning of the method according to the preferred embodiment of the invention a template minutia set has to be determined. Suppose that there are M sample fingerprint images $I^m$ captured from the same finger and obtained M minutia sets $F^m=\{F_k^m\}$ and input interest regions $S^m$, (m=1, 2, ..., M) by applying a minutia extraction algorithm. Then, the template minutia set $F^P=\{F_k^P, 0<k\leq K\}$ is initialized by letting $F^P=F^r$ with the interest region $S^P=S^r$ (1≦r≦M). K is the number of the minutiae in $F^P$. The template minutia set can for instance simply be determined by selecting the minutia set with the largest interest region as our initial template minutia set $F^P$.

In the rest M-1 minutia sets, any minutia set $F^m$ with m≠r can be picked out as input minutia set. To match it with the template minutia set $F^P$ the minutia-matching algorithm disclosed in [4] is applied.

However, the methods described in [5], [6], or [7] may be used alternatively as minutia-matching methods.

In the matching process, an aligned input minutia set $F^{Am}=\{F_k^{Am}\}$ is calculated by using equation (2) and an aligned input interest region $S^{Am}$ can be calculated. After matching, first all unmatched minutiae $F_k^{Am}$ located outside $S^P$ are removed from $F^{Am}$ and the minutia index k in the updated $F^{Am}$ is rearranged so that the matched minutia has the same index as its partner minutia in $F^P$ and the unmatched minutiae have indexes k=K+1, K+2, ....

Now, the template minutia set is updated by putting all unmatched minutiae $F_k^{Am}$ into $F^P$, i.e.

$$F^P \cup \{F_k^{Am} | k > K\} \Rightarrow F^P. \qquad (3)$$

Correspondingly, the number of the minutiae K in the updated template minutia set $F^P$ is also updated.

Using this updated template minutia set the above process is applied one by one to all other M-2 minutia sets. In this way M-1 aligned minutia sets $F^{Am}$ and interest regions $S^{Am}$ with $1 \leq r \leq M$ and $m \neq r$ result. To simplify the formula let $F^{Ar} = F^r$ and $S^{Ar} = S^r$. Now all minutiae in $F^{Am}$ ($1 \leq r \leq M$) are located within the interest region $S^{Ar}$. Matched minutiae have the same index k and unmatched minutiae have different index k ($1 \leq k \leq K$).

A minutia template update is conducted based on the assumption that matched minutiae (here have the same index k) represent the same minutiae and unmatched minutiae (here have different index k) represent different minutiae. If there exists a $F_k^{An}$ with $F_k^{An} \in F^{An}$ but $F_k^{Am} \notin F^{Am}$ and $(x_k^{An}, y_k^{An}) \in S^{Am}$, this indicates that minutia k (it might be genuine or spurious) was successfully extracted from the sample image $I^n$ but failed being extracted from sample image $I^m$ although its interest region $S^{Am}$ covers the position of this minutia. A minutia certainty value is defined as $c_k^{An} = 1$ and $c_k^{Am} = 0$ to represent this case.

However, if $(x_k^{An}, y_k^{An}) \notin S^{Am}$, the location of this minutia is outside the interest region of sample image $I^m$. In this case, the sample image $I^m$ provides no information about the certainty of minutia k so that $c_k^{Am}$ is not defined. For simplifying the expression, two index sets are defined for each minutia k as following:

$$D_k = \{m | F_k^{Am} \in F^{Am}\}, \quad (4)$$

$$R_k = \{m | (\exists F_k^{An})(F_k^{An} \in F^{An} \wedge (x_k^{An}, y_k^{An}) \in S^{Am})\}. \quad (5)$$

Obviously, $D_k$ consists of indexes of minutia sets $F^{Am}$ that contain minutia k and $R_k$ consists of indexes of interest regions $S^{Am}$ that cover the position of minutia k. This means $D_k \subseteq R_k$. The minutia certainty value $c_k^{Am}$ is then given by:

$$c_k^{Am} = \begin{cases} 1, & \text{if } m \in D_k \\ 0, & \text{if } m \notin D_k \wedge m \in R_k \\ \text{undefined}, & \text{if } m \notin R_k \end{cases} \quad (6)$$

Now let $F^E = \{F_k^E, c_k^E\}$ denote the estimated updated minutia set where $c_k^E$ is the certainty value of the estimated minutia $F_k^E$.

The estimated minutiae are conducted by:

$$F_k^E = \frac{1}{\sum_{\forall m, m \in D_k} wf_k^m} \sum_{\forall m, m \in D_k} wf_k^m F_k^{Am}, \quad (7)$$

$$c_k^E = \frac{1}{\sum_{\forall m, m \in R_k} wc_k^m} \sum_{\forall m, m \in R_k} wc_k^m c_k^{Am}. \quad (8)$$

where $wf_k^m$ and $wc_k^m$ are the weights of $F_k^{Am}$ and $c_k^{Am}$ respectively.

Using equation (7) and (8) an updated minutia set is estimated from a number of minutia sets extracted from sample fingerprints of the same finger. The estimated minutia parameter is the weighted arithmetic average over all matched minutiae and therefore has better accuracy. As a result, the exchanged minutiae type (ending or bifurcation) can be corrected.

For authenticating a future input fingerprint, only the minutiae whose certainty value are greater than a threshold $c_v$ are used.

This means that minutiae with certainty value lower than the threshold $c_v$ are regarded as spurious minutiae. The employment of the minutia certainty value makes it possible that the dropped minutiae in some sample fingerprints can be recovered in the estimated minutia set if they are extracted from some other sample fingerprints and spurious minutiae in some sample fingerprints can be removed from the estimated minutia set if they are absent from some other sample fingerprints.

For example, if we choose equal weights, the estimated minutia $F_k^E$ and its certainty value $c_k^E$ can be simply calculated by:

$$F_k^E = \frac{1}{M_k} \sum_{\forall m, m \in D_k} F_k^{Am}, \quad (9)$$

$$c_k^E = \frac{1}{N_k} \sum_{\forall m, m \in R_k} c_k^{Am}, \quad (10)$$

where $M_k$ is the number of fingerprints from which minutia k is extracted and $N_k$ is the number of fingerprints whose interest region covers the position of minutia k. It is straightforward to see that the estimated minutia certainty value represents the occurrence frequency of a minutia over all sample fingerprints whose interest region covers the position of this minutia. Therefore, the estimated minutia certainty value can be used to recover the dropped minutiae and remove the spurious minutiae.

Figure 3:
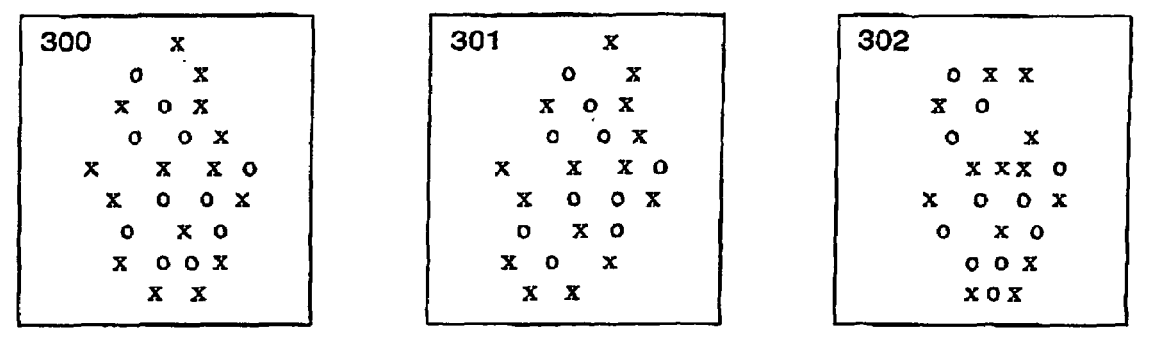

FIG. 3 shows a template minutia set 300, a first input minutia set 301 and second minutia set 302. The minutia sets 300, 301 and 302 comprise first minutiae 304, which are designated with the symbol "o" in FIG. 3, and second minutiae 305, which are designated with the symbol "x" in FIG. 3. The first minutiae 304 designate endings of ridges ($t_k = 0$) and the second minutiae 305 designate bifurcations of ridges ($t_k = 1$).

To enable the matching process, the input minutia sets 301 and 302 have to be aligned with the template minutia set 300 as already described above.

The three minutia sets 300, 301 and 302 show the minutiae extracted from three fingerprint images. The three fingerprint images are taken from the same finger at different times. Alternatively, the three fingerprint images can be matched based on a minutiae matching process. The first fingerprint image taken at a first time is used to determine the template minutia set 300. At a later point of time relative to the first fingerprint image the second fingerprint image is taken. As can clearly be seen, the first input minutia set 301 taken from the second fingerprint image should be aligned to the template minutia set 300. Further, the first input minutia set 301 comprises less minutiae than the template minutia set 300. Therefore, the template minutia set 300 is updated with respect to the minutia positions, directions, types as well as with certainty values $c_k^E$ for all minutiae $F_k^E$.

Finally, the third fingerprint image represented by the second input minutia set 302 is taken. The second input minutia set 302 has to be aligned with respect to the template minutia set 300. Thereafter, the second input minutia set 302 comprises further minutiae, which are already not incorporated in the template minutia set 300. Therefore, the template minutia set 300 is again updated.

In FIG. 4 an input interest region 401 of an input fingerprint is shown. The input interest region 401 is the boundary of the input fingerprint, which is described by a polygon 402 comprising eight points (1) . . . (8).

Let $(x_j^P, y_j^P)$ denote the coordinates of the eight points representing the template interest region and $(x_j^I, y_j^I)$ denote the coordinates of the eight points (1) . . . (8) representing the input interest region 401 with j=1, 2, . . . , 8 The aligned input interest region presented by $(x_j^A, y_j^A)$ is obtained by:

$$\begin{pmatrix} x_j^A \\ y_j^A \end{pmatrix} = \begin{pmatrix} x^P \\ y^P \end{pmatrix} + \begin{pmatrix} \cos(\Delta\varphi) & \sin(\Delta\varphi) \\ -\sin(\Delta\varphi) & \cos(\Delta\varphi) \end{pmatrix} \begin{pmatrix} x_j^I - x^I \\ y_j^I - y^I \end{pmatrix}, \quad (11)$$

where $(x^P, y^P)$ and $(x^I, y^I)$ are the corresponding points of the template minutia set and of the input minutia set, respectively, which are obtained by the minutia matching process.

A point (x, y) of a template minutia is within the input interest region 401 if and only if:

$$A_j x + B_j y + C_j < 0 (j=1, 2, \ldots, 8), \quad (12)$$

where $A_j = y_j^A - y_{j+1}^A$, $B_j = x_{j+1}^A - x_j^A$ and $C_j = -A_j x_j^A - B_j y_j^A$ with $(x_9^A, y_9^A) = (x_1^A, y_1^A)$.

Similarly, it can be determined whether a point (x, y) of aligned input minutia is within the template interest region by using equation (12) with $A_j = y_j^P - y_{j+1}^P$, $B_j = x_{j+1}^P - x_j^P$ and $C_j = -A_j x_j^P - B_j y_j^P$.

In the practical application of a fingerprint verification/identification system, input minutia sets are compared with template minutia sets. If an input minutia set is successfully matched with a template minutia set, it is verified or identified that these two minutia sets originate from the same finger.

Suppose the system received M aligned input minutia sets $\{F_k^{Am}, c_k^{Am}\}$ successfully matched with a template minutia set $\{F_k^P, c_k^P\}$. The updated template minutia set $\{F_k^E, c_k^E\}$, is calculated by equation (7) and (8) with the template minutia set and M matched input minutia sets. Usually the finger skin and imaging condition changes with time. Thus, in equations (7) and (8) the latter received input fingerprints should have higher weight than the earlier ones. In addition, the template fingerprint is usually captured with great caution during the registration whereas the input fingerprints might be captured with less caution during the verification/identification process. Therefore, a higher weight is assigned to the original template fingerprint than to the input fingerprints.

Without losing the generality, equation (8) can be rewritten as:

$$c_k^E = \beta_k^P c_k^P + \lambda \sum_{\forall m, m \in R_k} \beta_k^m c_k^{Am}, \quad (13)$$

with the condition:

$$\beta_k^P + \lambda \sum_{\forall m, m \in R_k} \beta_k^m = 1, \quad (14)$$

where $\beta_k^P$ is the weight for template minutiae and $\lambda\beta_k^m$ is the weight for input minutiae. $\lambda$ with $0<\lambda<1$ is used to distinguish the weight of template minutiae from the weights of input minutiae. Since input fingerprints are sequentially received by the system, $c_k^{Am}$ with $m \in R_k$ can be represented in a sequence $c_k^A(n)$ with $1 \leq n \leq N_k$. With $c_k^A(N_k)$ representing the newest input and $c_k^A(1)$ the oldest, the equation (13) can be rewritten into:

$$c_k^P(N_k) = \beta(N_k) c_k^P(0) + \lambda \sum_{n=0}^{N_k-1} \beta(n) c_k^A(N_k - n), \quad (15)$$

where $c_k^P(N_k)$ represents the updated minutia certainty value by one original template and $N_k$ input fingerprint entries. Since the original template $c_k^P(0)$ is even older than $c_k^A(1)$, $\beta(n)$ $(0<\beta(n)<\beta(n-1))$ weight the minutiae of different coming time.

By choosing a power series as the weights $\beta(n)=\alpha^n$, $(0<\alpha<1)$, the condition (14) can be expressed in a closed form $$\alpha^{N_k} + \lambda \sum_{n=0}^{N_k-1} \alpha^n = \alpha^{N_k} + \lambda \frac{1-\alpha^{N_k}}{1-\alpha} = 1. \quad (16)$$

By choosing $\lambda=1-\alpha$, the condition (16) will hold true independent on the value of $\alpha$ and the number of the element $N_k$ in the sum operator. Thus, the same value of $\alpha$ can be used for different number of fingerprint entries $N_k$, i.e.

$$c_k^P(N_k) = \alpha^{N_k} c_k^P(0) + (1-\alpha) \sum_{n=0}^{N_k-1} \alpha^n c_k^A(N_k - n), \quad (17)$$

and $$c_k^P(N_k + 1) = \alpha^{N_k+1} c_k^P(0) + (1-\alpha) \sum_{n=0}^{N_k} \alpha^n c_k^A(N_k + 1 - n). \quad (18)$$

From equations (17) and (18) results $$c_k^P(N_k+1) = \alpha c_k^P(N_k) + (1-\alpha) c_k^A(N_k+1). \quad (19)$$

Equation (19) is the recursive template minutia certainty value update formula, where $c_k^P(N_k)$ is the old template minutia certainty value and $c_k^P(N_k+1)$ is the new template minutia certainty value after the system receives a new entry $c_k^A(N_k+1)$.

In a similar way, a recursive template minutia parameter update formula can be obtained from equation (7) as $$F_k^P(N_k+1) = \alpha F_k^P(N_k) + (1-\alpha) F_k^A(N_k+1), \quad (20)$$

where $F_k^P(N_k)$ is the old template minutia and $F_k^P(N_k+1)$ is the new template minutia after the system receives a new entry $F_k^A(N_k+1)$.

Since a fingerprint verification/identification system usually has nonzero false acceptance rate, falsely accepted or falsely identified input fingerprints will produce negative effect for the template update. Therefore a larger matching score threshold $T_a$ with $T_a>T_v$ is used to determine if an input fingerprint is to be used to update the template. Furthermore, the shortest time interval $T_i$ between two successive updates of a template could be limited to prevent the purposely-repeated abuse of the template update. In this way, the negative effect of on-line fingerprint template self-updating procedure can be diminished.

With respect to FIG. 5 the proposed fingerprint template self-updating algorithm is described.

In the first step 501, users enroll in the fingerprint verification/identification system. A minutia set $F^P=\{F_k^P\}$ of each template fingerprint is extracted by using the method described in [3]. For multiple enrollments of the same finger, equations (9) and (10) can be used to generate an updated template.

Eight or 16 points $\{(x_j^P, y_j^P)\}$ are determined to represent the interest region $S^P$ of each template minutia set by using the method described in this application. All minutia certainty values $c_k^P$ of all template minutia sets are initially assigned to be 1 for single enrollment or, alternatively, are calculated by equation (10) for multiple enrollments. The current time $t_c$ is read and the update time $t_u$ of each template minutia set by $t_u=t_c$ is initialized.

In the second step 502, the system is waiting until an input fingerprint is received.

If an input fingerprint is received, the third step 503 is executed. An input minutia set $F^I=\{F_k^I\}$ of the input fingerprint is extracted by using the method described in [3].

In step 504, the input minutia set $F^I$ is one by one matched with $F^{PV}=\{F_k^P|(F_k^P\in F^P)^\wedge(c_k^P\geq c_v)\}$ of each template minutia set to get the largest matching score ms and the corresponding aligned input minutia set $F^A=\{F_k^A\}$ by using the method described in [4].

In step 505 it is determined whether the largest matching score ms is lower than or equal to a predetermined threshold $T_v$. If this is true, put out a rejection information and go back to step 502. Otherwise output the best-matched template ID.

The current time $t_c$ and the last update time $t_u$ of the best-matched template minutia set are read. As already mentioned above, a larger matching score threshold $T_a$ with $T_a>T_v$ is used to determine if an input fingerprint is to be used to update the template minutia set. Furthermore, the shortest time interval $T_i$ between two successive updates of a template minutia set could be limited to prevent the purposely-repeated abuse of the updated template minutia set. In this way, the negative effect of on-line fingerprint template self-updating procedure can be diminished. In step 506 it is determined whether the matching score ms is lower than or equal to the larger matching score threshold $T_a$ or whether $(t_c-t_u)$ is lower than or equal to the shortest time interval $T_i$. If this is true, go back to step 502. Otherwise let $t_u=t_c$ and go to step 507.

Eight or 16 points $\{(x_j^I, y_j^I)\}$ are determined in step 507 to represent the input interest region $S^I$ by using the method described above.

An aligned interest region $S^A=\{(x_j^A, y_j^A)\}$ of the input fingerprint is obtained using equation (11).

In step 508, the best matched template minutia set $F^P=\{F_k^P\}$ will be updated as follows, wherein a template minutia and an input minutia have the same index k if and only if they are matched:

For all matched template minutiae, the minutia parameter $F_k^P$ and certainty value $c_k^P$ are updated by $\alpha F_k^P+(1-\alpha)F_k^A \Rightarrow F_k^P$ and $\alpha c_k^P+(1-\alpha) \Rightarrow c_k^P$.

Use equation (12) to find all unmatched template minutiae that are located within the aligned interest region $S^A$ of the input fingerprint. The certainty values of these minutiae are updated by $\alpha c_k^P \Rightarrow c_k^P$.

The certainty values of other template minutiae are unchanged $c_k^P \Rightarrow c_k^P$.

Use equation (12) to obtain all unmatched input minutiae that are located in the template interest region $S^P$. Merge these minutiae into the template by $F_k^A \Rightarrow F_k^P$ and $c_k^P=(1-\alpha)$.

In step 509 the template minutia set is further updated by removing template minutiae whose certainty values are lower than a threshold $c_T$ ($c_T<1-\alpha$). The updated template minutia set is saved and the process goes back to step 502. The step 509 is aimed at limiting the enlargement of the template size. This can be regarded as letting $c_k^P=0$, if $c_k^P<c_T$.

The above described on-line fingerprint template processing scheme updates the template minutia parameter and updates the template minutia certainty value by using a recursive algorithm that implements a weighted averaging over all received matched fingerprints. The weighted averaging increases the precision of minutia parameter ($x_k$, $y_k$, $\phi_k$), corrects the exchanged minutiae $t_k$, recovers the dropped minutiae (from $c_k^P<c_v$ to $c_k^P\geq c_v$) and removes the spurious minutiae (from $c_k^P\geq c_v$ to $c_k^P<c_v$). Furthermore, the proposed scheme has the weights of the received fingerprints changed with the time so that the older fingerprints have less and less contribution to the weighted average. In this way, the system gradually weakens the effect of the older skin and imaging conditions and enhances the recent ones. By using the common region of two matched fingerprints, the template minutiae will not grow to cover the whole finger but are kept within the region of the initial template fingerprint. The proposed recursive algorithm minimizes the computation time and memory size required by calculating a weighted average. This makes the proposed approach suitable to be employed in an on-line fingerprint verification/identification system.

In this document, the following publications are cited:

[1] X. D. Jiang, W. Y. Yau and W. Ser, Minutiae Extraction by Adaptive Tracing the Gray Level Ridge of the Fingerprint Image, Proc. IEEE Sixth International Conference on Image Processing, Kobe, Japan, Vol. 2, pp. 852-856, October 1999;

[2] D. Maio and D. Maltoni, Direct Gray-Scale Minutiae Detection in Fingerprints, IEEE Transactions on Pattern Analysis and Machine Intelligence, Vol. 19, No. 1, pp. 27-39, January 1997;

[3] X. D. Jiang, W. Y. Yau and W. Ser. Detecting the Fingerprint Minutiae by Adaptive Tracing the Gray Level Ridge, Pattern Recognition, Vol. 34, No. 5, pp. 999-1013, May 2001;

[4] X. D. Jiang and W. Y. Yau, Fingerprint Minutiae Matching Based on the Local And Global Structures, Proc. 15th International Conference on Pattern Recognition, ICPR, Barcelona, Spain, Vol. 2, pp. 1042-1045, September 2000;

[5] U.S. Pat. No. 4,135,147;

[6] U.S. Pat. No. 4,646,352:

[7] U.S. Pat. No. 5,493,621;

[8] X. D. Jiang, W. Y. Yau, and W. Ser, Fingerprint Image Processing for Automatic Verification, Proc. IEEE Second International Conference on Information, Communication & Signal Processing, Singapore, December 1999;

[9] A. K. Jain, L. Hong, S. Pankanti, and R. Bolle, An Identity-Authentication System Using Fingerprints, Proc. IEEE, Vol. 85, No. 9, pp. 1365-1388, September 1997.

What is claimed is:

1. A method for computer-based processing a template minutia set of a fingerprint, comprising the following steps:
   a) providing the template minutia set comprising template minutiae and a template interest region, b) providing an input minutia set according to an input fingerprint comprising input minutiae and an input interest region, c) matching the input minutia set with the template minutia set, thereby determining matching template/input minutiae and non-matching template/input minutiae, and d) determining an updated template minutia set which comprises the adding of non-matching input minutiae inside the termplate interest region to the termplate minutia set if the input minutia set and the template minutia set are known to originate from a same finger or their matching result is higher than a matching threshold.

2. The method according to claim 1, wherein the method further comprises the following steps:

determining a plurality of input minutia sets comprising a certainty value for each input minutia, and determining the updated template minutia set by generating updated template minutiae from all input minutia sets with their corresponding weights.

3. The method according to claim 2, wherein the plurality of input minutia sets comprises a time series of input minutia sets and wherein the certainty value is a function of time of the corresponding input minutia set.

4. The method according to claim 2, wherein step d) further comprises:

increasing the certainty values of matching template minutiae, decreasing the certainty values of non-matching template minutiae that are inside the input interest region, deleting template minutiae from the updated template minutia set if their certainty values are below a certainty threshold, and using the template minutiae, whose certainty values are larger than the certainty threshold, for the future matching.

5. The method according to claims 1, wherein the boundaries of the interest regions are obtained using points located on the respective boundary.

6. The method according to claim 5, wherein the boundaries of the template interest region and of the input interest region each define a polygon.

7. The method according to claim 6, wherein the polygons are described by eight or 16 points each.

8. The method according to claim 1, wherein between step b) and step c) the input minutia set is aligned with respect to the template minutia set.

9. The method according to claim 1, wherein the template minutia set is selected from a number of reference minutia sets.

10. The method according to claim 9, wherein each reference minutia set comprises a reference interest region and wherein the reference minutia set with the largest reference interest region is selected as the template minutia set.

11. The method according to claim 1, wherein step c) further comprises the step of determining of whether an input minutia is located inside the template interest region or outside of it, and whether a template minutia is located inside the input interest region or outside of it.

12. The method according to claim 8, wherein aligning the input minutia set with respect to the template minutia set is performed by a transformation function given by the following formula:

$$\begin{pmatrix} x_j^A \\ y_j^A \end{pmatrix} = \begin{pmatrix} x^P \\ y^P \end{pmatrix} + \begin{pmatrix} \cos(\Delta\varphi) & \sin(\Delta\varphi) \\ -\sin(\Delta\varphi) & \cos(\Delta\varphi) \end{pmatrix} \cdot \begin{pmatrix} x_j^I - x^I \\ y_j^I - y^I \end{pmatrix},$$

wherein $(x_j^A, y_j^A)$ are aligned point vectors representing the location of an aligned point with j as characterizing number of each aligned point, $(x^P, y^P)$ is a reference point of the template minutia set, $(x_j^I, y_j^I)$ is a point in the input interest region with j as characterizing number of each point, $(x^I, y^I)$ is a reference point of the input minutia set, and $\Delta\phi$ is an angle enclosed from $(x^P, y^P)$ and $(x^I, y^I)$.

13. The method according to claim 1, wherein steps b) to d) are iteratively repeated for all input minutia sets of a plurality of input minutia sets with the updated template minutia set as the template minutia set of the next iteration, and the next input minutia set as the input minutia set of the next iteration.

14. A computer-based device for processing a template minutia set of a fingerprint, comprising a processing unit, which is arranged to execute the following steps:

a) providing the template minutia set comprising template minutiae, a template interest region, and a certainty value for each template minutia, b) providing an input minutia set according to an input fingerprint comprising input minutiae, an input interest region, and a certainty value for each input minutia, c) matching the input minutia set with the template minutia set, thereby determining matching template/input minutiae and non-matching template/input minutiae, d) determining a transformation function using the matching result, wherein the transformation function describes the relation between the template minutiae and the input minutiae, e) determining an updated template minutia set by adding non-matching input minutiae inside the template interest region to the updated template minutia set if the input minutia set and the template minutia set are known originated from a same finger or their matching result is higher than a matching threshold, increasing the certainty values of matching template minutiae, decreasing the certainty values of non-matching template minutiae that are inside the input interest region, deleting template minutiae from the updated template minutia set if their certainty values are below a certainty threshold, and using the template minutiae, whose certainty values are larger than the certainty threshold, for the future matching, and f) repeating steps b) to e) iteratively for all input minutia sets of a plurality of input minutia sets with the updated template minutia set as the template minutia set of the next iteration, and the next input minutia set as the input minutia set of the next iteration.

15. A computer readable storage medium, having a program recorded thereon, where the program makes the computer execute a procedure comprising the following steps for processing a template minutia set of a fingerprint:

a) providing the template minutia set comprising template minutiae, a template interest region, and a certainty value for each template minutia,
b) providing an input minutia set according to an input fingerprint comprising input minutiae, an input interest region, and a certainty value for each input minutia,
c) matching the input minutia set with the template minutia set, thereby determining matching template/input minutiae and non-matching template/input minutiae,
d) determining a transformation function using the matching result, wherein the transformation function describes the relation between the template minutiae and the input minutiae,
e) determining an updated template minutia set by
  adding non-matching input minutiae inside the template interest region to the updated template minutia set if the input minutia set and the template minutia set are known originated from a same finger or their matching result is higher than a matching threshold,
  increasing the certainty values of matching template minutiae,
  decreasing the certainty values of non-matching template minutiae that are inside the input interest region,
  deleting template minutiae from the updated template minutia set if their certainty values are below a certainty threshold, and
  using the template minutiae, whose certainty values are larger than the certainty threshold, for the future matching, and
f) repeating steps b) to e) iteratively for all input minutia sets of a plurality of input minutia sets with
  the updated template minutia set as the template minutia set of the next iteration, and
the next input minutia set as the input minutia set of the next iteration.

* * * * *

UNITED STATES PATENT AND TRADEMARK OFFICE
CERTIFICATE OF CORRECTION

PATENT NO. : 7,369,688 B2 Page 1 of 1
APPLICATION NO. : 10/477050
DATED : May 6, 2008
INVENTOR(S) : Wee Ser, Xudong Jiang and Wei Yun Yau It is certified that error appears in the above-identified patent and that said Letters Patent is hereby corrected as shown below:

ON THE TITLE PAGE

Please correct the following:

In Item [73], "Univeristy" should read --University--

Please correct the following:

Col. 15 Claim 5, line 39: "claims" should read --claim--

Col. 16 Claim 14, line 44: "known originated" should read --known to originate--

Col. 17 Claim 15, line 19: "known originated" should read --known to originate--

Signed and Sealed this

Thirtieth Day of September, 2008

JON W. DUDAS
*Director of the United States Patent and Trademark Office*